United States Patent
Yoshida et al.

(10) Patent No.: US 11,987,695 B2
(45) Date of Patent: May 21, 2024

(54) RESIN COMPOSITION FOR FORMING MAGNETIC MEMBER AND METHOD FOR MANUFACTURING MAGNETIC MEMBER

(71) Applicant: SUMITOMO BAKELITE CO., LTD., Tokyo (JP)

(72) Inventors: Masato Yoshida, Tokyo (JP); Wakana Nobe, Tokyo (JP); Kensuke Notsu, Tokyo (JP)

(73) Assignee: SUMITOMO BAKELITE CO., LTD., Tokyo (JP)

( * ) Notice: Subject to any disclaimer, the term of this patent is extended or adjusted under 35 U.S.C. 154(b) by 281 days.

(21) Appl. No.: 17/611,687

(22) PCT Filed: Apr. 8, 2020

(86) PCT No.: PCT/JP2020/015869
§ 371 (c)(1),
(2) Date: Nov. 16, 2021

(87) PCT Pub. No.: WO2020/235246
PCT Pub. Date: Nov. 26, 2020

(65) Prior Publication Data
US 2022/0213312 A1    Jul. 7, 2022

(30) Foreign Application Priority Data

May 17, 2019 (JP) ................. 2019-093896
Nov. 1, 2019 (JP) ................. 2019-199674

(51) Int. Cl.
| | |
|---|---|
| *C08L 63/00* | (2006.01) |
| *B29C 43/00* | (2006.01) |
| *H01F 1/28* | (2006.01) |
| *H01F 41/02* | (2006.01) |
| *B29K 63/00* | (2006.01) |
| *B29K 505/12* | (2006.01) |
| *B29K 509/02* | (2006.01) |
| *B29L 31/34* | (2006.01) |
| *H01F 27/255* | (2006.01) |

(52) U.S. Cl.
CPC ............ *C08L 63/00* (2013.01); *B29C 43/003* (2013.01); *H01F 1/28* (2013.01); *H01F 41/02* (2013.01); *B29K 2063/00* (2013.01); *B29K 2505/12* (2013.01); *B29K 2509/02* (2013.01); *B29K 2995/0008* (2013.01); *B29L 2031/34* (2013.01); *C08L 2205/02* (2013.01); *H01F 27/255* (2013.01)

(58) Field of Classification Search
CPC .... C08K 3/08; C08K 2003/0856; C08K 3/20; C08K 3/36; C08K 9/00; C08K 2201/005; C08K 2201/01; C08K 2201/014; B29C 43/003; C08L 63/00; C08L 2205/02; B29K 2063/00; B29K 2505/12; B29K 2509/02; B29K 2995/0008; H01F 1/28; H01F 27/255; H01F 41/02
See application file for complete search history.

(56) References Cited

U.S. PATENT DOCUMENTS

| | | | | |
|---|---|---|---|---|
| 11,600,414 B2 * | 3/2023 | Yamamoto | .......... | H01F 1/15308 |
| 2013/0135072 A1 * | 5/2013 | Inaba | ................. | H01F 27/23 |
| | | | | 336/90 |
| 2013/0182460 A1 * | 7/2013 | Marusawa | ........ | C01G 49/0072 |
| | | | | 363/13 |
| 2015/0022309 A1 * | 1/2015 | Marusawa | ............ | H01F 1/01 |
| | | | | 252/62.55 |
| 2017/0365387 A1 * | 12/2017 | Kusawake | ........... | H01F 37/00 |
| 2018/0102209 A1 * | 4/2018 | Inaba | ................ | H01F 1/01 |
| 2018/0374618 A1 * | 12/2018 | Takada | ............. | H01F 3/14 |
| 2021/0313101 A1 * | 10/2021 | Yamamoto | .......... | C22C 45/02 |
| 2023/0212719 A1 * | 7/2023 | Yamamoto | .......... | B22F 9/002 |
| | | | | 148/104 |

FOREIGN PATENT DOCUMENTS

| | | | | |
|---|---|---|---|---|
| EP | 1541640 A1 * | 6/2005 | ............ | C09D 5/03 |
| JP | 61-152004 A | 7/1986 | | |
| JP | 6-333714 A | 12/1994 | | |
| JP | 2002-313632 A | 10/2002 | | |
| JP | 2009-155554 A | 7/2009 | | |
| JP | 2016035959 A * | 3/2016 | ............ | H01F 1/33 |
| JP | 2016-72406 A | 5/2016 | | |
| JP | 2016-174142 A | 9/2016 | | |
| KR | 101953032 B1 * | 2/2019 | ............ | H01F 1/33 |
| WO | WO 2019/112002 A1 | 6/2019 | | |

OTHER PUBLICATIONS

Clarivate Analytics machine translation of: JP 2016035959 A to Yamanishi et al., published Mar. 17, 2016 (Year: 2016).*
Clarivate Analytics machine translation of: KR 101953032 B1 to Yonezawa et al., published Feb. 27, 2019 (Year: 2019).*
Hoganas MSDS for ABC100.30 published by www.hoganas.com/pmc Jun. 2016 (Year: 2016).*
International Search Report (PCT/ISA/210) issued in PCT/JP2020/015869 mailed on Jun. 30, 2020.
Written Opinion (PCT/ISA/237) issued in PCT/JP2020/015869 mailed on Jun. 30, 2020.

* cited by examiner

*Primary Examiner* — Jane L Stanley
(74) *Attorney, Agent, or Firm* — Birch, Stewart, Kolasch & Birch, LLP (57) ABSTRACT

A resin composition for forming a magnetic member of the present invention, which is used for compression molding, includes a thermosetting resin, magnetic particles, and non-magnetic particles having a lower specific gravity and a smaller cumulative 50% particle diameter $D_{50}$ than the magnetic particles, in which the resin composition for forming a magnetic member is solid at 25° C.

17 Claims, 3 Drawing Sheets

RESIN COMPOSITION FOR FORMING MAGNETIC MEMBER AND METHOD FOR MANUFACTURING MAGNETIC MEMBER

TECHNICAL FIELD

The present invention relates to a resin composition for forming a magnetic member and a method for manufacturing a magnetic member.

BACKGROUND ART

So far, various developments have been conducted in a molding method of a resin composition for forming a magnetic member. As a technique of this kind, for example, a technique disclosed in Patent Document 1 is known. Patent Document 1 discloses that an organic resin is mixed with a magnetic powder and the obtained mixture is injection-molded or transfer-molded (Claims 1, 11, and the like of Patent Document 1)

RELATED DOCUMENT

Patent Document

[Patent Document 1] Japanese Unexamined Patent Publication No. 2002-313632

SUMMARY OF THE INVENTION

However, as a result of studies, the present inventor has found that, in the composition obtained by mixing the magnetic powder and the organic resin, which is disclosed in Patent Document 1, there is room for improvement in terms of resin burrs during compression molding.

As described above, transfer molding is generally performed by a molding method of a resin composition for forming a magnetic member, which includes magnetic particles and a thermosetting resin.

However, since material loss occurs in the transfer molding, it is necessary to consider other molding unit. In other technical fields, compression molding has been known as the other molding unit. Since high pressure is generally required for the compression molding, it has been considered that the compression molding is difficult to use in a technical field of the resin composition for forming a magnetic member. Therefore, in the technical field of the resin composition for forming a magnetic member, sufficient studies have not been conducted on the compression molding.

As a result of studies of the present inventor on the compression molding, even in a case of not using such a high pressure practically, that is, even in a case where the same low pressure as during transfer molding is used, it has been found that the resin composition for forming a magnetic member can be molded.

However, in a case where the resin composition for forming a magnetic member, which includes the magnetic particles and the thermosetting resin, is compression-molded, resin burrs may occur.

On the other hand, as a result of further studies by the present inventor, it has been found that, by using non-magnetic particles having a lower specific gravity and a smaller cumulative 50% particle diameter $D_{50}$ than the magnetic particles, the resin burrs in the compression molding can be reduced, so that a resin composition for forming a magnetic member, which is suitable for the compression molding, can be realized, thereby completing the present invention.

According to the present invention, a resin composition for forming a magnetic member, which is used for compression molding, including a thermosetting resin, magnetic particles, and non-magnetic particles having a lower specific gravity and a smaller cumulative 50% particle diameter $D_{50}$ than the magnetic particles, in which the resin composition for forming a magnetic member is solid at 25° C., is provided.

In addition, according to the present invention, a method for manufacturing a magnetic member, which includes placing the above-described resin composition for forming a magnetic member in a mold using a compression molding apparatus, and curing the resin composition for forming a magnetic member to obtain a magnetic member, is provided.

According to the present invention, a resin composition for forming a magnetic member with suppressed resin burrs during compression molding and a method for manufacturing a magnetic member using the same are provided.

DESCRIPTION OF EMBODIMENTS

Hereinafter, embodiments of the present invention will be described with reference to the drawings. In all drawings, the same constituents are designated by the same reference numerals, and description thereof will not be repeated. In addition, the drawings are schematic views and do not match the actual dimensional ratio.

In the present specification, a term "abbreviation" means to include a range in consideration of manufacturing tolerances, assembly variations, and the like, unless otherwise specified explicitly.

In the present specification, a notation "a to b" in a description of a numerical range means a or more and b or less unless otherwise specified. For example, "1 to 5% by mass" means "1% by mass or more and 5% by mass or less".

In a notation of a group (atomic group) in the present specification, a notation which does not indicate whether it is substituted or unsubstituted includes both those having no substituent and those having a substituent. For example, an "alkyl group" includes not only an alkyl group having no substituent (unsubstituted alkyl group) but also an alkyl group having a substituent (substituted alkyl group).

Unless otherwise specified, a term "organic group" in the present specification means an atomic group obtained by removing one or more hydrogen atoms from an organic compound. For example, a "monovalent organic group" represents an atomic group obtained by removing one hydrogen atom from any organic compound.

The outline of the resin composition for forming a magnetic member according to the present embodiment will be described.

A resin composition for forming a magnetic member according to the present embodiment, which is used for compression molding, includes a thermosetting resin, magnetic particles, and non-magnetic particles having a lower specific gravity and a smaller cumulative 50% particle diameter $D_{50}$ than the magnetic particles. The resin composition for forming a magnetic member is solid at 25° C.

According to the findings of the present inventor, it has been found that, by using the non-magnetic particles having a lower specific gravity and a smaller cumulative 50% particle diameter $D_{50}$ than the magnetic particles, resin burrs during compression molding can be suppressed, so that a resin composition for forming a magnetic member, which is suitable for the compression molding, can be realized.

The detailed mechanism is not clear, but the non-magnetic particles having low specific gravity and small particle diameter are more likely to flow out from a mold to a vent during compression molding than the magnetic particles, so that the non-magnetic particles are appropriately dispersed in a molten product in the vent. Since the molten product in which the non-magnetic particles are dispersed has high viscosity and thixotropy, it is considered that it is difficult for the molten product to flow out from the vent, and thus the resin burrs are suppressed. On the other hand, since the magnetic particles remain in the molten product in the mold, it is considered that, in a magnetic member composed of a cured product of the molten product, sufficient magnetic characteristics such as iron loss and relative magnetic permeability can be obtained.

By using the resin composition for forming a magnetic member according to the present embodiment, occurrence of the resin burrs during the compression molding can be suppressed. By reducing the resin burrs, it is possible to improve continuous moldability. In addition, a magnetic member having excellent magnetic characteristics can be molded.

In addition, in a manufacturing process of the magnetic member, material loss can be reduced as compared with transfer molding. In addition, in the manufacturing process of the magnetic member by the compression molding, low-pressure molding can be performed, and it is relatively easy to increase filling of the magnetic particles.

The magnetic member according to the present embodiment can be used for various applications, and can be suitably used, for example, as a magnetic component in an electric/electronic device. More specifically, it is preferable to be used as a magnetic core of a coil or the like.

<Resin Composition>

Components which can be included in the resin composition according to the present embodiment will be described.

The resin composition includes a thermosetting resin and a magnetic powder.

(Thermosetting Resin)

Examples of the thermosetting resin include an epoxy resin, a phenol resin, a polyimide resin, a bismaleimide resin, a urea resin, a melamine resin, a polyurethane resin, a cyanate ester resin, a silicone resin, an oxetane resin (oxetane compound), a (meth)acrylate resin, an unsaturated polyester resin, a diallyl phthalate resin, and a benzoxazine resin. These may be used alone or in combination of two or more thereof. From the viewpoint of heat resistance, for example, an epoxy resin may be used.

(Epoxy Resin)

The resin composition according to the present embodiment may include an epoxy resin.

The epoxy resin may be any resin as long as it includes an epoxy group. Examples of the epoxy resin include bisphenol-type epoxy resins such as a bisphenol A-type epoxy resin, a bisphenol F-type epoxy resin, a tetramethyl bisphenol F-type epoxy resin, a bisphenol S-type epoxy resin, a bisphenol E-type epoxy resin, a bisphenol M-type epoxy resin, a bisphenol P-type epoxy resin, and a bisphenol Z-type epoxy resin; novolac-type epoxy resins such as a phenol novolac-type epoxy resin and a cresol novolac-type epoxy resin; and epoxy resins such as a biphenyl-type epoxy resin, a biphenyl aralkyl-type epoxy resin, an arylalkylene-type epoxy resin, a naphthalene-type epoxy resin, an anthracene-type epoxy resin, a phenoxy-type epoxy resin, a dicyclopentadiene-type epoxy resin, a norbornene-type epoxy resin, an adamantane-type epoxy resin, a fluorene-type epoxy resin, and a trisphenylmethane-type epoxy resin.

The epoxy resin may be semi-cured (solid) at room temperature (25° C.).

The epoxy resin may include a polyfunctional epoxy resin having three or more epoxy groups in a molecule and/or a low-viscosity epoxy resin having an ICI viscosity at 150° C. of 0.1 to 50 mPa·s.

In particular, it is preferable that the epoxy resin includes at least one selected from the group consisting of an epoxy resin including a trisphenylmethane structure as an example of the polyfunctional epoxy resin and an epoxy resin including a bisphenol structure as an example of the low-viscosity epoxy resin. It is considered that, due to appropriate rigidity of the structures of these epoxy resins, it is easy to make curing behavior more appropriate, and by extension, moldability can be further improved.

(Epoxy Resin (A1))

The resin composition according to the present embodiment may include an epoxy resin (A1) (also simply referred to as an "epoxy resin (A1)") having a triarylmethane skeleton.

The "having a triarylmethane skeleton" specifically includes a partial structure in which three of four hydrogen atoms of a methane ($CH_4$) are replaced with aromatic rings. The "aromatic ring" here may be a benzene-based aromatic ring such as a benzene ring or a naphthalene ring, or may be a heteroaromatic ring such as furan, thiophene, pyrrole, pyrazole, imidazole, pyridine, pyridazine, pyrimidine, and pyrazine. In addition, the three aromatic rings may be the same or different from each other.

However, from the viewpoint of cost, the viewpoint of mechanical properties of a molded product (magnetic member), and the like, the aromatic ring is preferably a benzene-based aromatic ring such as a benzene ring or a naphthalene ring. In addition, it is preferable that the three aromatic rings are the same.

The epoxy resin (A1) preferably has a structural unit represented by General Formula (a1). By connecting two or more structural units represented by General Formula (a1), the triarylmethane skeleton (triphenylmethane skeleton) is formed.

By using the epoxy resin having a structural unit represented by General Formula (a1) as the epoxy resin (A1), in particular, it is possible to more reliably obtain an effect of good heat resistance in a case of forming a magnetic member.

(a1)

In General Formula (a1), in a case of a plurality of $R^{11}$'s, the plurality of $R^{11}$'s each independently represent a monovalent substituent, in a case of a plurality of $R^{12}$'s, the plurality of $R^{12}$'s each independently represent a monovalent substituent, i represents an integer of 0 to 3, and j represents an integer of 0 to 4.

Examples of the monovalent substituent in $R^{11}$ and $R^{12}$ include a monovalent organic group, a halogen atom, a hydroxy group, and a cyano group.

Examples of the monovalent organic group include an alkyl group, an alkenyl group, an alkynyl group, an alkylidene group, an aryl group, an aralkyl group, an alkaryl group, a cycloalkyl group, an alkoxy group, a heterocyclic group, and a carboxyl group. The number of carbon atoms in the monovalent organic group is, for example, 1 to 30, preferably 1 to 20, more preferably 1 to 10, and still more preferably 1 to 6.

Examples of the alkyl group include a methyl group, an ethyl group, an n-propyl group, an isopropyl group, an n-butyl group, an isobutyl group, a sec-butyl group, a tert-butyl group, a pentyl group, a neopentyl group, a hexyl group, a heptyl group, an octyl group, a nonyl group, and a decyl group.

Examples of the alkenyl group include an allyl group, a pentenyl group, and a vinyl group.

Examples of the alkynyl group include an ethynyl group.

Examples of the alkylidene group include a methylidene group and an ethylidene group.

Examples of the aryl group include a tolyl group, a xylyl group, a phenyl group, a naphthyl group, and an anthracenyl group.

Examples of the aralkyl group include a benzyl group and a phenethyl group.

Examples of the alkaryl group include a tolyl group and a xylyl group.

Examples of the cycloalkyl group include an adamantyl group, a cyclopentyl group, a cyclohexyl group, and a cyclooctyl group.

Examples of the alkoxy group include a methoxy group, an ethoxy group, an n-propoxy group, an isopropoxy group, an n-butoxy group, an s-butoxy group, an isobutoxy group, a t-butoxy group, an n-pentyloxy group, a neopentyloxy group, and an n-hexyloxy group.

Examples of the heterocyclic group include an epoxy group and an oxetanyl group.

i and j are each independently preferably 0 to 2 and more preferably 0 or 1.

In one aspect, both i and j are 0. That is, as the one aspect, all benzene rings in General Formula (a1) do not have a substituent other than the specified glycidyloxy group as a monovalent substituent.

The number average molecular weight of the epoxy resin (A1) is not particularly limited, but is typically approximately 200 to 700. Usually, the number average molecular weight can be obtained as a standard polystyrene-equivalent value by gel permeation chromatography (GPC).

(Epoxy Resin (A2))

The resin composition according to the present embodiment may include at least one epoxy resin (A2) (also simply referred to as an "epoxy resin (A2)") selected from the group consisting of an epoxy resin having a structural unit represented by General Formula (a2-1) and a bisphenol-type epoxy resin having a structure represented by General Formula (a2-2)

(a2-1)

In General Formula (a2-1),

Cy represents a divalent organic group including an alicyclic structure, in a case of a plurality of $R^{21}$'s, the plurality of $R^{21}$'s each independently represent a monovalent substituent, and l represents an integer of 0 to 3.

(a2-2)

In General Formula (a2-2), two R's each independently represent a hydrogen atom or a methyl group, in a case of a plurality of $R^{22}$'s, the plurality of $R^{22}$'s each independently represent a monovalent substituent, in a case of a plurality of $R^{23}$'s, the plurality of $R^{23}$'s each independently represent a monovalent substituent, and p and q each independently represent an integer of 0 to 4.

The alicyclic structure included in Cy of General Formula (a2-1) is not particularly limited, and may be a monocyclic structure or a polycyclic structure. From the viewpoint of appropriate viscosity at the time of melting and mechanical properties of the obtained magnetic member, it is preferable to include a polycyclic structure.

The number of carbon atoms in Cy is typically 5 to 20, preferably 6 to 18 and more preferably 6 to 15.

Examples of an alicyclic ring include monocyclic alicyclic rings (3- to 15-membered, preferably 5- or 6-membered cycloalkane ring) such as a cyclopentane ring, a cyclohexane ring, a cyclooctane ring, and a cyclododecane ring.

In addition, examples thereof also include polycyclic alicyclic rings (bridged carbon rings) such as a decalin ring (perhydronaphthalene ring), a perhydroindene ring (bicyclo[4.3.0]nonane ring), a perhydroanthracene ring, a perhydrofluorene ring, a perhydrophenanthrene ring, a perhydroacenaphthene ring, a perhydrophenalene ring, a norbornane ring (bicyclo[2.2.1]heptane ring), an isobornane ring, an adamantane ring, a bicyclo[3.3.0]octane ring, a tricyclo[5.2.1.0$^{2,6}$] decane ring, and a tricyclo[6.2.1.0$^{2,7}$]undecane ring. The term "polycyclic" preferably means approximately 2 to 4 rings.

For example, Cy can be a divalent group obtained by removing two hydrogen atoms from these monocyclic or polycyclic alicyclic rings.

The alicyclic structure included in Cy may or may not have a substituent. For example, one or more hydrogen atoms in the alicyclic structure may be replaced with any substituent. Examples of the substituent include those described as the monovalent substituent of $R^{11}$ and $R^{12}$ in General Formula (a1).

In addition, Cy may include a carbonyl structure (=O) or the like.

In addition, Cy may be the alicyclic structure itself, or may have the alicyclic structure and other structures. For example, the alicyclic structure may be directly bonded to a benzene ring (by a single bond), or may be bonded to a benzene ring through any linking group.

More specifically, the latter case can be expressed as -Cy'-L- in the -Cy- portion of General Formula (a2-1). Here, Cy' is an alicyclic ring (specific examples thereof include the above-described monocyclic or polycyclic alicyclic rings), and L is a divalent linking group. Examples of the divalent linking group of L include an alkylene group (for example, having 1 to 6 carbon atoms), a cycloalkylene group, an ether group, a carbonyl group, an ester group, and a group in which two or more of these are linked.

Specific examples of the monovalent substituent of $R^{21}$ in General Formula (a2-1) include the same as those described as the monovalent substituent of $R^{11}$ and $R^{12}$ in General Formula (a1).

In General Formula (a2-1), 1 is preferably 0 to 2 and more preferably 0 or 1.

In one aspect, 1 is 0. That is, as the one aspect, the benzene ring in General Formula (a2-1) does not have a substituent other than the specified glycidyloxy group as a monovalent substituent.

Specific examples of the monovalent substituent of $R^{22}$ and $R^{23}$ in General Formula (a2-2) include the same as those described as the monovalent substituent of $R^{11}$ and $R^{12}$ in General Formula (a1). Here, as the monovalent substituent of $R^{22}$ and $R^{23}$, an alkyl group is preferable, a linear or branched alkyl group having 1 to 6 carbon atoms is more preferable, and a methyl group is particularly preferable.

p and q in General Formula (a2-2) are each independently preferably 0 to 3 and more preferably 0 to 2.

From the viewpoint of appropriate fluidity at the time of melting, and the like, in a case where two R's are methyl groups, p and q are preferably 0, and in a case where two R's are hydrogen atoms, p and q are preferably 1 or 2.

The number average molecular weight (standard polystyrene-equivalent value measured by GPC) of the epoxy resin having the structural unit represented by General Formula (a2-1) is not particularly limited, but is, for example, 200 to 400.

An epoxy resin including a biphenyl structure is specifically an epoxy resin including a structure in which two benzene rings are linked by a single bond. The benzene ring here may or may not have a substituent.

Specifically, the epoxy resin including a biphenyl structure has a partial structure represented by General Formula (BP).

In General Formula (BP),
in a case of a plurality of $R^a$'s or $R^b$'s, the plurality of $R^a$'s or $R^b$'s are each independently a monovalent organic group, a hydroxyl group, or a halogen atom,
r and s are each independently 0 to 4, and
* represents that it is linked to another atomic group.

Specific examples of the monovalent organic group of $R^a$ and $R^b$ include those listed as a monovalent organic group of $R^1$, $R^2$, and $R^3$ in General Formula (AM) described later.

r and s are each independently preferably 0 to 2 and more preferably 0 or 1. In one aspect, both r and s are 0.

More specifically, the epoxy resin including a biphenyl structure has a structural unit represented by General Formula (BP1)

In General Formula (BP1),
definitions and specific aspects of $R^a$ and $R^b$ are the same as those of General Formula (BP),
definitions and preferred ranges of r and s are the same as those of General Formula (BP),
in a case of a plurality of $R^c$'s, the plurality of $R^c$'s are each independently a monovalent organic group, a hydroxyl group, or a halogen atom, and
t is an integer of 0 to 3.

Specific examples of the monovalent organic group of $R^c$ include those listed as a monovalent organic group of $R^1$, $R^2$, and $R^3$ in General Formula (AM) described later.

t is preferably 0 to 2 and more preferably 0 or 1.

The resin composition according to the present embodiment may include an epoxy resin having a low ICI viscosity at 150° C. as the epoxy resin.

The resin composition may include an epoxy resin having an ICI viscosity at 150° C. of more preferably 0.1 to 50 mPa·s, still more preferably 0.5 to 45 mPa·s, and particularly preferably 1 to 40 mPa·s. The epoxy resin (A2) is used as an epoxy resin having an ICI viscosity in such a numerical range. These may be used alone or in combination of two or more thereof.

As an ICI viscosity measuring device, an ICI cone-plate viscometer from MST Engineering, Ltd. and the like can be used.

The molecular weight (number average molecular weight) of the epoxy resin is not particularly limited, but is, for example, 100 to 3,000, preferably 100 to 2,000 and more preferably approximately 100 to 1,000.

The resin composition according to the present embodiment may include only one type of the epoxy resin, or may include two or more types of the epoxy resin. In addition, epoxy resins of the same type, which have different weight average molecular weights, may be used in combination.

The amount of the epoxy resin in the resin composition is, for example, 0.1 to 20% by mass, preferably 0.5 to 10% by mass based on the entire resin composition.

In addition, the content of the epoxy resin is, for example, 1% to 30% by volume, preferably 5% to 25% by volume based on the entire resin composition.

By appropriately adjusting the amount ratio of the epoxy resin (A1) and the epoxy resin (A2), balance of heat resistance, moldability, and blocking resistance can be achieved at a higher level.

Specifically, in a case where the number of moles of the epoxy group included in the epoxy resin (A1) is defined as $M_1$ and the number of moles of the epoxy group included in the epoxy resin (A2) is defined as $M_2$, the value of $M_1/M_2$ is, for example, 0.2 to 1.8, preferably 0.5 to 1.5, more preferably 0.6 to 1.4, and still more preferably 0.8 to 1.2.

The value of $M_1/M_2$ can be obtained by a molar calculation from the molecular weights and epoxy equivalents of the epoxy resin (A1) and the epoxy resin (A2).

In addition, in a case where the resin composition includes the polyfunctional epoxy resin and the bisphenol-type epoxy resin, in the above-described $M_1/M_2$, $M_1$ may be the number of moles of the epoxy group included in the polyfunctional epoxy resin and $M_2$ may be the number of moles of the epoxy group included in the bisphenol-type epoxy resin.

The total amount of the epoxy resin (A1) and the epoxy resin (A2) in the resin composition is, for example, 0.1 to 20% by mass, preferably 0.5 to 10% by mass based on the entire resin composition.

The total amount of the epoxy resin (A1) and the epoxy resin (A2) in the resin composition is, for example, 1% to 30% by volume, preferably 5% to 25% by volume based on the entire resin composition.

By setting such a numerical range, the moldability can be further improved, and mechanical properties or magnetic characteristics of the obtained cured product (magnetic member) can be further improved.

The resin composition according to the present embodiment may include a curing agent. The curing agent is not particularly limited as long as it reacts with the thermosetting resin. In a case where the epoxy resin is used as the thermosetting resin, for example, a phenol resin or an aromatic diamine may be used as the curing agent.

(Phenol-Based Curing Agent)

The resin composition according to the present embodiment may include a phenol-based curing agent.

The phenol-based curing agent is not particularly limited as long as it includes a phenolic hydroxy group and can react with the epoxy resin (A1) and/or the epoxy resin (A2). The phenol-based curing agent may be a low molecular weight substance or a polymer.

The resin composition according to the present embodiment may include the epoxy resin (A1) having a triarylmethane skeleton, at least one epoxy resin (A2) selected from the group consisting of an epoxy resin having a structural unit represented by General Formula (a2-1) described above and an epoxy resin having a structure represented by General Formula (a2-2) described above, and a phenol-based curing agent (B).

The phenol-based curing agent preferably includes any skeleton selected from the group consisting of a biphenyl skeleton, a novolac skeleton, and a triphenylmethane skeleton. In a case where the phenol-based curing agent includes any of these skeletons, heat resistance of the magnetic member can be particularly enhanced.

The "biphenyl skeleton" refers to a skeleton in which two benzene rings are linked through a single bond. More specifically, the "biphenyl skeleton" is a skeleton represented by General Formula (BP).

(BP)

In General Formula (BP), in a case of a plurality of $R^1$'s or $R^2$'s, the plurality of $R^1$'s or $R^2$'s each independently represent a monovalent substituent, r and s are each independently 0 to 4, and

* represents that it is linked to another atomic group.

Specific examples of the monovalent substituent of $R^1$ and $R^2$ include the same as those described as the monovalent substituent of $R^{11}$ and $R^{12}$ in General Formula (a1).

r and s are each independently preferably 0 to 2 and more preferably 0 or 1. In one aspect, both r and s are 0.

Specific examples of the phenol-based curing agent having a biphenyl skeleton include those having a structural unit represented by General Formula (BP1).

(BP1)

In General Formula (BP1), definitions and specific examples of $R^1$ and $R^2$ are the same as those of General Formula (BP), definitions and preferred ranges of r and s are the same as those of General Formula (BP), in a case of a plurality of $R^3$'s, the plurality of $R^3$'s each independently represent a monovalent substituent, and t is an integer of 0 to 3.

Specific examples of the monovalent substituent of $R^3$ include the same as those described as the monovalent substituent of $R^{11}$ and $R^{12}$ in General Formula (a1).

t is preferably 0 to 2 and more preferably 0 or 1.

Specific examples of the phenol-based curing agent having a novolac skeleton include those having a structural unit represented by General Formula (N).

(N)

In General Formula (N),
R⁴ represents a monovalent substituent, and
u represents an integer of 0 to 3.

Specific examples of the monovalent substituent of $R^4$ include the same as those described as the monovalent substituent of $R^{11}$ and $R^{12}$ in General Formula (a1).

u is preferably 0 to 2, more preferably 0 or 1, and still more preferably 0.

In a case where the phenol-based curing agent is a polymer or an oligomer, the number average molecular weight (standard polystyrene-equivalent value measured by GPC) of the phenol-based curing agent is not particularly limited, but is, for example, approximately 200 to 800.

The content of the phenol-based curing agent in the resin composition is, for example, 0.1 to 20% by mass, preferably 0.5 to 10% by mass based on the entire resin composition.

In addition, the content of the phenol-based curing agent in the resin composition is, for example, 1% to 30% by volume, preferably 5% to 25% by volume based on the entire resin composition.

By appropriately adjusting the amount of the phenol-based curing agent, the moldability can be further improved, and mechanical properties or magnetic characteristics of the obtained cured product (magnetic member) can be improved.

(Aromatic Diamine)

The resin composition according to the present embodiment may include an aromatic diamine.

As the aromatic diamine, any compound having one or more aromatic ring structures and two amino groups (—NH₂) in one molecule can be used without particular limitation. As the aromatic diamine, a compound having a structure in which the amino group is directly linked to the aromatic ring.

The reason why both moldability and heat resistance can be improved by a resin composition including an epoxy resin, an aromatic diamine, and magnetic particles is not entirely clear, but it is presumed that (1) appropriate fluidity can be obtained by appropriate reaction rate between the epoxy group of the epoxy resin and the amino group of the aromatic diamine and (2) after the molten resin composition is cured, a glass transition temperature rises due to a crosslinked structure of the epoxy resin-aromatic diamine and a rigid aromatic ring skeleton of the aromatic diamine itself (thermal motion of molecules in the cured product is restricted) are involved.

The present invention is not limited by this presumption.

The melting point can be used as a reference in a case of selecting the aromatic diamine. By using an aromatic diamine having an appropriate melting point, the aromatic diamine is appropriately melted during kneading and molding of the resin composition. As a result, the fluidity can be improved. In addition, since the resin composition can be kneaded more uniformly, it is considered that the heat resistance and mechanical characteristics (strength and the like) of the finally obtained cured product (magnetic member) can be improved.

Specifically, the melting point of the aromatic diamine is preferably 160° C. or lower, more preferably 150° C. or lower, and still more preferably 140° C. or lower.

The lower limit value of the melting point of the aromatic diamine is not particularly limited, but is, for example, 60° C. or higher, preferably 70° C. or higher, and more preferably 80° C. or higher.

In a case where a commercially available product is used as the aromatic diamine, a catalog value can be adopted for the melting point.

Incidentally, the aromatic diamine is preferably a solid at normal temperature (25° C.) and not a liquid. In addition, the resin composition according to the present embodiment may include an amine compound other than the aromatic diamine, but the amine compound is also preferably a solid at normal temperature (25° C.) and not a liquid.

The resin composition according to the present embodiment is typically prepared in a form of granules or tablets. From the viewpoint of ease of preparation, handleability of the resin composition in a form of granules or tablets, which is obtained by the preparation, and the like, the aromatic diamine (and in some cases, the amine compound other than the aromatic diamine) is preferably solid at normal temperature.

The resin composition preferably includes a compound represented by General Formula (AM) as the aromatic diamine.

(AM)

In General Formula (AM),
in a case of a plurality of X's, the plurality of X's are each independently any group selected from the group consisting of a single bond, a linear or branched alkylene group, an ether group, a carbonyl group, an ester group, and a group in which two or more of these are linked, Y is any group selected from the group consisting of a single bond, a linear or branched alkylene group, an ether group, a carbonyl group, an ester group, and a group in which two or more of these are linked, in a case of a plurality of $R^1$'s, $R^2$'s, or $R^3$'s, the plurality of $R^1$'s, $R^2$'s, or $R^3$'s are each independently a monovalent organic group, a hydroxyl group, or a halogen atom, k, l, and m are each independently an integer of 0 to 4, and n is an integer of 0 or more.

As the linear or branched alkylene group of X and Y, those having 1 to 6 carbon atoms are preferable, and those having 1 to 3 carbon atoms are more preferable.

In a case where a part or all of X and Y are branched alkylene groups, the skeleton of the aromatic diamine can be appropriately rigid. This is considered to be related to the appropriateness of the above-described "melting point". In addition, in a case where the skeleton of the aromatic diamine is appropriately rigid, it is considered that effects of further improving the heat resistance of the cured product (magnetic member) and improving the mechanical strength can also be obtained.

Examples of the monovalent organic group of $R^1$, $R^2$, and $R^3$ include an alkyl group, an alkenyl group, an alkynyl group, an alkylidene group, an aryl group, an aralkyl group, an alkaryl group, a cycloalkyl group, an alkoxy group, a heterocyclic group, and a carboxyl group.

Examples of the alkyl group include a methyl group, an ethyl group, an n-propyl group, an isopropyl group, an n-butyl group, an isobutyl group, a sec-butyl group, a tert-butyl group, a pentyl group, a neopentyl group, a hexyl group, a heptyl group, an octyl group, a nonyl group, and a decyl group.

Examples of the alkenyl group include an allyl group, a pentenyl group, and a vinyl group.

Examples of the alkynyl group include an ethynyl group.

Examples of the alkylidene group include a methylidene group and an ethylidene group.

Examples of the aryl group include a tolyl group, a xylyl group, a phenyl group, a naphthyl group, and an anthracenyl group.

Examples of the aralkyl group include a benzyl group and a phenethyl group.

Examples of the alkaryl group include a tolyl group and a xylyl group.

Examples of the cycloalkyl group include an adamantyl group, a cyclopentyl group, a cyclohexyl group, and a cyclooctyl group.

Examples of the alkoxy group include a methoxy group, an ethoxy group, an n-propoxy group, an isopropoxy group, an n-butoxy group, an s-butoxy group, an isobutoxy group, a t-butoxy group, an n-pentyloxy group, an neopentyloxy group, and an n-hexyloxy group.

Examples of the heterocyclic group include an epoxy group and an oxetanyl group.

The total number of carbon atoms in the monovalent organic group of $R^1$, $R^2$, and $R^3$ is, for example, 1 to 30, preferably 1 to 20, more preferably 1 to 10, and particularly preferably 1 to 6.

k, l, m are each independently preferably an integer of 0 or 1.

In one aspect, k, l, and m are all 0. That is, as the one aspect, all benzene rings in General Formula (AM) are not substituted with an atomic group other than the amino group.

n is preferably 0 to 3 and more preferably 0 to 2.

Specific examples of the aromatic diamine are shown below. The aromatic diamine is not limited to the following. In addition, as a matter of course, examples thereof also include 1,3-bis[1-(4-aminophenyl)-1-methylethyl]benzene, 2,2'-bis[4-(4-aminophenoxy)phenyl]propane, and 1,3-bis(4-aminophenoxy)benzene, which are used in Examples described later.

Boiling point: 74° C.

Boiling point: 110° C.

Boiling point: 103° C.

Boiling point: 106° C.

Boiling point: 132° C.

Boiling point: >140° C.

Boiling point: >164° C.

Boiling point: >175° C.

Boiling point: >170° C.

As the aromatic diamine, a commercially available product may be used. The aromatic diamine can be obtained from, for example, SEIKA CORPORATION, MITSUI FINE CHEMICAL Inc., FUJIFILM Wako Pure Chemical Corporation, and the like.

The resin composition according to the present embodiment may include only one type of the aromatic diamine, or may include two or more types of the aromatic diamine.

The amount of the aromatic diamine in the resin composition is, for example, 0.1 to 20% by mass, preferably 0.5 to 10% by mass based on the entire resin composition.

In addition, the content of the aromatic diamine in the resin composition is, for example, 1% to 30% by volume, preferably 5% to 25% by volume based on the entire resin composition. By setting such a numerical range, it is possible to improve moldability and mechanical properties.

The amount of the aromatic diamine in the composition is preferably adjusted appropriately in relation to the epoxy resin.

Specifically, the ratio of the number of moles of the epoxy group in the epoxy resin to the number of moles of the amino group in the aromatic diamine (that is, the number of moles of the epoxy group of the epoxy resin/the number of moles of the amino group in the aromatic diamine) is preferably 1 to 3, more preferably 1.5 to 2.5, and still more preferably 1.7 to 2.3.

One amino group (—NH$_2$) can react with two epoxy groups. Therefore, it is considered that, by adjusting the amount ratio of the epoxy resin and the aromatic diamine such that the above-described ratio is around 2, the cross-linked structure of the amino group and the epoxy group during curing can be denser. Then, it is considered that the glass transition temperature of the cured product (magnetic member) can be increased to enhance the heat resistance.

The above-described ratio can be obtained by calculating from the epoxy equivalent or epoxy value of the epoxy resin included in the composition, the molecular weight of the epoxy resin (these are usually listed in the epoxy resin catalog), the molecular weight of the aromatic diamine, and the like.

(Magnetic Particles)

The resin composition according to the present embodiment includes magnetic particles.

As the magnetic particles, any particles can be used as long as the molded product produced by using the resin composition according to the present embodiment exhibits magnetism.

The magnetic particles preferably include one or two or more elements selected from the group consisting of Fe, Cr, Co, Ni, Ag, and Mn. By selecting any of these magnetic particles, the magnetic characteristics can be further enhanced.

In particular, the magnetic characteristics can be further enhanced by using particles including 85% by mass or more of Fe as the magnetic particles.

In the present embodiment, the magnetic particles include iron-based particles.

The iron-based particles refer to particles including an iron atom as a main component (content mass of the iron atom is the largest in the chemical composition), and more specifically, refer to an iron alloy having the largest content mass of the iron atom in the chemical composition.

The iron-based particles may include iron-based amorphous particles or may be composed of only iron-based amorphous particles. However, the iron-based particles may include iron-based amorphous particles and iron-based crystal particles. In addition, as the iron-based particles, those having one kind of chemical composition may be used, or two or more kinds having different chemical compositions may be used in combination.

More specifically, as the iron-based particles, particles (soft magnetic iron-high-content particles) exhibiting soft magnetism and having an iron atom (Fe) content of 85% by mass or more can be used. The soft magnetism refers to ferromagnetism having a small coercive force, and generally, ferromagnetism having a coercive force of 800 A/m or less is referred to as soft magnetism.

Examples of a constituent material of such particles include a metal-containing material having an iron content of 85% by mass or more as a constituent element. Such a metal material having a high iron content as a constituent element exhibits soft magnetism in which magnetic characteristics such as magnetic permeability and magnetic flux density are relatively good. Therefore, a resin composition capable of exhibiting good magnetic characteristics in a case of being molded can be obtained.

Examples of a form of the metal-containing material include simple substances, solid solutions, eutectic crystals, and alloys such as an intermetallic compound. By using the particles composed of such a metal material, it is possible to obtain a resin composition having excellent magnetic characteristics derived from iron, that is, magnetic characteristics such as high magnetic permeability and high magnetic flux density.

In addition, the above-described metal-containing material may contain an element other than iron as a constituent element. Elements of the element other than iron include B, C, N, O, Al, Si, P, S, Ti, V, Cr, Mn, Co, Ni, Cu, Zn, Y, Zr, Nb, Mo, Cd, In, and Sn, and one kind of these may be used or two or more kinds of these may be used in combination.

Specific examples of the above-described metal-containing material include pure iron, silicon steel, iron-cobalt alloy, iron-nickel alloy, iron-chromium alloy, iron-aluminum alloy, carbonyl iron, stainless steel, and a composite material containing one or two or more of these. From the viewpoint of availability, magnetic characteristics, and the like, silicon steel powder can be preferably used.

In the above description, the iron-based particles have been mainly described, but certainly, the magnetic particles may be other particles. For example, the magnetic particles may be magnetic particles including Ni-based soft magnetic particles, Co-based soft magnetic particles, and the like.

In addition, the magnetic particles may be surface-treated. For example, the surface may be treated with a coupling agent or treated with plasma. By such a surface treatment, it is possible to bond a functional group to the surface of the magnetic particles. The functional group can cover a part or all of the surface of these particles.

As such a functional group, a functional group represented by the General Formula (1) can be used.

(1)

[in the formula, R represents an organic group, X is Si, Ti, Al, or Zr, and * is one of atoms constituting the magnetic particles]

For example, the above-described functional group is preferably a residue formed by a surface treatment with a known coupling agent such as a silane-based coupling agent, a titanium-based coupling agent, an aluminum-based coupling agent, and a zirconium-based coupling agent, or a residue of a coupling agent selected from the group consisting of a silane-based coupling agent and a titanium-based coupling agent. As a result, in a case where the magnetic particles are blended with the resin composition to obtain a resin composition, fluidity thereof can be further enhanced.

In a case where the surface is treated with a coupling agent, examples thereof include a method of immersing the magnetic particles in a diluted solution of the coupling agent and a method of directly spraying the coupling agent to the magnetic particles.

The amount of the coupling agent used is, for example, preferably 0.01 to 1 part by mass and more preferably 0.05 to 0.5 part by mass with respect to 100 parts by mass of the magnetic particles.

Examples of a solvent for reacting the coupling agent with the magnetic particles include methanol, ethanol, and isopropyl alcohol. In addition, the amount of the coupling agent used in this case is preferably 0.1 to 2 parts by mass and more preferably 0.5 to 1.5 parts by mass with respect to 100 parts by mass of the solvent.

The reaction time (for example, immersion time in the diluted solution) between the coupling agent and the magnetic particles is preferably 1 to 24 hours.

In addition, in a case where the functional group as described above is bonded, plasma treatment may be performed in advance as a part of the surface treatment on the magnetic particles. For example, by performing oxygen plasma treatment, OH groups are generated on the surface of the magnetic particles, and a bonding between the magnetic particles and the residue of the coupling agent through oxygen atoms is easy. As a result, the functional group can be bonded more firmly.

The plasma treatment here is preferably oxygen plasma treatment. As a result, the OH group can be efficiently modified on the surface of the magnetic particles.

The pressure of the oxygen plasma treatment is not particularly limited, but is preferably 100 to 200 Pa and more preferably 120 to 180 Pa.

The flow rate of processing gas in the oxygen plasma treatment is not particularly limited, but is preferably 1000 to 5000 mL/min and more preferably 2000 to 4000 mL/min.

The output of the oxygen plasma treatment is not particularly limited, but is preferably 100 to 500 W and more preferably 200 to 400 W.

The treatment time of the oxygen plasma treatment is appropriately set according to the above-described various conditions, but is preferably 5 to 60 minutes and more preferably 10 to 40 minutes.

In addition, argon plasma treatment may be further performed before the oxygen plasma treatment is performed. As a result, an active site for modifying the OH group can be formed on the surface of the magnetic particles, so that the modification of the OH group can be performed more efficiently.

The pressure of the argon plasma treatment is not particularly limited, but is preferably 10 to 100 Pa and more preferably 15 to 80 Pa.

The flow rate of processing gas in the argon plasma treatment is not particularly limited, but is preferably 10 to 100 mL/min and more preferably 20 to 80 mL/min.

The output of the argon plasma treatment is preferably 100 to 500 W and more preferably 200 to 400 W.

The treatment time of the argon plasma treatment is preferably 5 to 60 minutes and more preferably 10 to 40 minutes.

The fact that the magnetic particles and the residue of the coupling agent are bonded through an oxygen atom can be confirmed by, for example, a Fourier transform infrared spectrophotometer.

In addition, the surface treatment as described above may be applied to all particles included in the resin composition, or may be applied to only some of the particles.

In addition, another coating treatment may be applied to a base of the surface treatment described above. Examples of such a coating treatment include a resin coating of a silicone resin, a phosphoric acid coating, and a silica coating. By applying such a coating treatment, insulating property of the magnetic particles can be further enhanced. Such a coating treatment may be applied as needed or may be omitted. This coating treatment may be applied alone, not as a base of the surface treatment described above.

From another point of view, the magnetic particles preferably have a shape close to a perfect circle (true sphere). It is considered that this reduces friction between the particles and further enhances the fluidity.

Specifically, "circularity" defined below is determined for any 10 or more (preferably 50 or more) magnetic particles, and an average circularity obtained by averaging the values is preferably 0.60 or more and more preferably 0.75 or more.

Definition of circularity: when a contour of the magnetic particles is observed with a scanning electron microscope, in a case where an isoarea equivalent circle diameter obtained from the contour is defined as Req and a radius of a circle circumscribing the contour is defined as Rc, a value of Req/Rc In addition, a median diameter $D_{50}$ (average particle diameter) of the iron-based particles on a volume basis is, for example, 0.5 to 100 μm or less, preferably 1.0 to 75 μm and more preferably 3.1 to 60 μm. By appropriately adjusting the particle diameter (median diameter), it is possible to further improve the fluidity during molding and improve magnetic performance. The average particle diameter of the iron-based amorphous particles may also be within the above-described numerical range of the average particle diameter of the iron-based particles.

From the viewpoint of good fluidity and improvement of magnetic performance due to high filling, it is preferable to appropriately adjust the particle diameter of the magnetic particles.

The resin composition according to the present embodiment may include two or more types of the iron-based particles having different average particle diameters. As a result, it is possible to increase filling of the iron-based particles, and enhance the magnetic characteristics and mechanical strength.

In addition, the resin composition according to the present embodiment may include two or more types of the iron-based particles having different average particle diameters. As a result, the magnetic characteristics can be further improved. For example, ferrous base particles having a $D_{50}$ of 30 μm or more and 100 μm or less and ferric base particles having a $D_{50}$ of more than 3.0 μm and less than 30 μm may be used in combination.

The median diameter $D_{50}$ can be obtained by, for example, a laser diffraction/scattering type particle diameter distribution measuring device. Specifically, a particle diameter distribution curve is obtained by measuring the magnetic particles in a dry manner with a particle diameter distribution measuring device "LA-950" manufactured by HORIBA, Ltd., and the $D_{50}$ can be obtained by analyzing this distribution curve.

The content of the iron-based particles (magnetic particles) in the resin composition is preferably 85% by mass or more, more preferably 90% by mass or more, and still more preferably 93% by mass or more based on the entire resin composition. From the viewpoint of practically ensuring the fluidity of the resin composition, the upper limit of the content of the iron-based particles (magnetic particles) in the resin composition is, for example, 99% by mass or less. By sufficiently increasing the content of the iron-based particles, magnetic performance (magnetic permeability, iron loss, and the like) can be improved.

In addition, on a volume basis, the content of the magnetic particles in the resin composition is preferably 60% by volume or more, more preferably 70% by volume or more, and still more preferably 80% by volume or more based on the entire resin composition. From the viewpoint of practically ensuring the fluidity of the resin composition, the upper limit of the content is, for example, 95% by volume or less.

(Non-Magnetic Particles)

From the viewpoint of adjusting the fluidity and the like, the resin composition according to the present embodiment may include non-magnetic particles exhibiting non-magnetism.

As the non-magnetic particles, particles having a lower specific gravity and a smaller cumulative 50% particle diameter $D_{50}$ than the magnetic particles are used.

In addition, in the present specification, non-magnetism refers to having no ferromagnetism.

Since the resin composition includes the non-magnetic particles, the occurrence of the resin burrs during the compression molding is suppressed. Therefore, the continuous moldability of the resin composition is better. Therefore, a molded product with few molding defects can be obtained.

Examples of a constituent material of the non-magnetic particles include ceramic materials and glass materials. Among these, those including a ceramic material are preferably used. Since such non-magnetic particles have a high affinity with a thermosetting resin, the fluidity of the resin composition can be maintained.

Examples of the ceramic material include oxide-based ceramic materials such as silica, alumina, zirconia, titania, magnesia, and calcia, nitride-based ceramic materials such as silicon nitride and aluminum nitride, and carbide-based ceramic materials such as silicon carbide and boron carbide. These may be used alone or in combination of two or more thereof. Among these, the non-magnetic particles may include silica particles or alumina particles.

In addition, the ceramic material preferably includes silica. Silica has a high affinity with a thermosetting resin and a high insulating property, and is therefore useful as a constituent particle of the non-magnetic particles. Therefore, the non-magnetic particles may include silica particles.

The specific gravity of the non-magnetic particles is preferably 1.5 to 6.0, more preferably 1.7 to 5.0, and still more preferably 1.8 to 4.5. Since such non-magnetic particles have a small specific gravity, the non-magnetic particles easily flow together with the molten product of the resin composition. Therefore, in a case where the molten product of the resin composition flows toward gaps of a molding mold during molding, the non-magnetic particles easily flow together with the molten product.

The specific gravity of the magnetic particles or the non-magnetic particles can be measured using a powder densitometer by a vapor phase substitution method.

The lower limit of the cumulative 50% particle diameter $D_{50}$ (median diameter) of the non-magnetic particles in the volume-based particle diameter distribution curve is, for example, 0.05 µm or more, preferably 0.1 µm or more and more preferably 0.15 µm or more. As a result, it is possible to suppress an increase in the viscosity of the resin composition. On the other hand, the upper limit of the particle diameter $D_{50}$ of the non-magnetic particles is, for example, 3.0 µm or less, preferably 2.5 µm or less and more preferably 2.0 µm or less. As a result, the resin burrs can be suppressed. In addition, the above-described particle diameter is a particle diameter which is preferable for preventing the above-described "exudation" and in which the non-magnetic particles easily flow together with the molten product of the resin composition.

In addition, the cumulative 50% particle diameter $D_{50}$ value of the non-magnetic particles in the volume-based particle diameter distribution curve is preferably 3.0 µm or less and smaller than the $D_{50}$ of the magnetic particles, but the difference therebetween is more preferably 1.0 µm or more, still more preferably 1.5 µm or more, and particularly preferably 2.0 µm or more.

As the non-magnetic particles, particles having various shapes can be used, but from the viewpoint of suppressing the increase in the viscosity of the resin composition, it is preferable to use spherical particles.

In addition, the average circularity (this definition is the same as that in the magnetic particles) of the non-magnetic particles is not particularly limited, but is preferably 0.50 to 1 and more preferably 0.75 to 1. In a case where the circularity is within this range, the fluidity of the resin composition can be ensured by utilizing rolling of the non-magnetic particles themselves, while the non-magnetic particles are likely to be clogged in the gaps and the like and it is easy to suppress exudation of the thermosetting resin. That is, it is possible to achieve both the fluidity of the resin composition and the suppression of the exudation of the thermosetting resin.

The non-magnetic particles may be surface-treated. For example, a method of treating the surface with a coupling agent may be used. As the coupling agent, for example, a known coupling agent such as a silane-based coupling agent, a titanium-based coupling agent, an aluminum-based coupling agent, and a zirconium-based coupling agent may be used. Among these, a silane-based coupling agent or a titanium-based coupling agent may be used. As a result, in a case where the non-magnetic particles are blended with the resin composition to obtain a resin composition, fluidity thereof can be further enhanced.

The content of the non-magnetic particles is appropriately selected according to the specific gravity, but for example, is preferably 0.1% to 5.0% by mass and more preferably 0.5% to 3.0% by mass in terms of mass, based on the entire resin composition. As a result, deterioration of the magnetic characteristics and occurrence of the resin burrs can be suppressed.

The lower limit of the content of the non-magnetic particles in terms of volume is, for example, 1% by volume or more, preferably 1.5% by volume or more and more preferably 2% by volume or more in the total of 100% by volume of the non-magnetic particles and the magnetic particles. As a result, the occurrence of the resin burrs can be suppressed. On the other hand, the lower limit of the content of the non-magnetic particles in terms of volume is, for example, 10% by volume or less, preferably 7% by volume or less and more preferably 5% by volume or less in the total of 100% by volume of the non-magnetic particles and the magnetic particles. As a result, the deterioration of the magnetic characteristics can be suppressed.

In addition, the lower limit of the content of the non-magnetic particles and the magnetic particles in terms of volume is, for example, 60% by volume or more, preferably 70% by volume or more and more preferably 75% by volume or more in 100% by volume of the resin composition. As a result, the magnetic characteristics can be improved. On the other hand, the upper limit of the content of the non-magnetic particles and the magnetic particles in terms of volume is, for example, 95% by volume or less, preferably 85% by volume or less and more preferably 83% by volume or less in 100% by volume of the resin composition. As a result, the fluidity of the resin composition can be ensured, and good molded product can be obtained.

The resin composition according to the present embodiment may include any component other than the thermosetting resin, the curing agent, the magnetic particles, and the magnetic particles. Hereinafter, optional components will be described.

(Mold Release Agent)

The resin composition according to the present embodiment may include a mold release agent. As a result, releasability of the resin composition during molding can be improved.

Examples of the mold release agent include natural waxes such as carnauba wax, synthetic waxes such as montanic acid ester wax and polyethylene oxide wax, higher fatty acids such as zinc stearate and metal salts thereof, and paraffin. These may be used alone or in combination of two or more thereof.

In a case where a mold release agent is used, the content thereof is preferably 0.01 to 3% by mass and more preferably 0.05 to 2% by mass based on the entire resin composition. As a result, the effect of improving the releasability can be surely obtained.

(Curing Catalyst)

The resin composition according to the present embodiment may include a curing catalyst. As a result, curability of the resin composition can be improved.

As the curing catalyst, any catalyst can be used as long as it promotes curing reaction of the epoxy resin. For example, a known epoxy curing catalyst can be used.

Specific examples thereof include phosphorus atom-containing compounds such as organic phosphine, a tetra-substituted phosphonium compound, a phosphobetaine compound, an adduct of phosphine compound and quinone compound, and an adduct of phosphonium compound and silane compound; imidazoles (imidazole-based curing catalyst) such as 2-methylimidazole; and nitrogen atom-containing compounds such as amidines and tertiary amines, for example, 1,8-diazabicyclo[5.4.0]undecene-7 and benzyldimethylamine, and quaternary salts of amidine or amine.

In a case where a curing catalyst is used, only one type may be used, or two or more types may be used.

In a case where a curing catalyst is used, the content thereof is preferably 0.01% to 1% by mass and more preferably 0.03% to 0.5% by mass with respect to the entire resin composition. By setting such a numerical range, the effect of sufficiently improving the curability can be obtained.

(Thermoplastic Resin)

From the viewpoint of adjusting fluidity and moldability, the resin composition according to the present embodiment may include a thermoplastic resin.

Examples of the thermoplastic resin include acrylic resins, polyamide resins (for example, nylon and the like), thermoplastic urethane resins, polyolefin resins (for example, polyethylene, polypropylene, and the like), polycarbonates, polyester resins (for example, polyethylene terephthalate, polybutylene terephthalate, and the like), polyacetals, polyphenylene sulfides, polyether ether ketones, liquid crystal polymers, fluororesins (for example, polytetrafluoroethylene, polyvinylidene fluoride, and the like), modified polyphenylene ethers, polysulfones, polyether sulfones, polyarylates, polyamideimides, polyether imides, and thermoplastic polyimides.

In a case where a thermoplastic resin is used, one type may be used alone, or two or more different types may be used in combination. In addition, two or more resins of the same type, which have different weight average molecular weights, may be used in combination. In addition, a certain resin and its prepolymer may be used in combination.

In a case where a thermoplastic resin is used, the amount thereof is preferably 0.1 to 20% by mass and more preferably 0.5 to 10% by mass based on the entire resin composition. As a result, it is considered that the effect of adjusting the fluidity and moldability can be sufficiently obtained.

(Other Components)

The resin composition according to the present embodiment may include a component other than the above-described components. For example, the resin composition according to the present embodiment may include a low stress agent, a coupling agent, an adhesion aid, a coloring agent, an antioxidant, an anticorrosion, a dye, a pigment, a flame retardant, and the like.

Examples of the low stress agent include silicone compounds such as a polybutadiene compound, an acrylonitrile butadiene copolymer compound, a silicone oil, and a silicone rubber. In a case where a low stress agent is used, only one type may be used, or two or more types may be used in combination.

As the coupling agent, the above-described coupling agent used for the surface treatment of the magnetic particles can be used. Examples thereof include a silane-based coupling agent, a titanium-based coupling agent, a zirconia-based coupling agent, and an aluminum-based coupling agent. In a case where a coupling agent is used, only one type may be used, or two or more types may be used in combination.

The minimum melt viscosity of the resin composition for forming a magnetic member, which is measured in a range of 80° C. to 250° C., is, for example, 50 Pa·s or more and 500 Pa·s or less, preferably 60 Pa·s or more and 450 Pa·s or less, and preferably 70 Pa·s or more and 400 Pa·s or less. By setting the melt viscosity to the above-described upper limit value or less, the fluidity can be enhanced and excellent moldability can be realized. In addition, by setting the melt viscosity to the above-described lower limit value or more, it is possible to suppress occurrence of resin leakage from the mold during the compression molding, and it is possible to suppress precipitation of the magnetic powder in the resin composition during the compression molding.

The temperature at which the melt viscosity of the resin composition for forming a magnetic member is minimum, which is measured in a range of 80° C. to 250° C., is, for example, within a range of 100° C. or higher and 150° C. or lower, preferably 105° C. or higher and 145° C. or lower, and more preferably 110° C. or higher and 140° C. or lower. Within such a range, it is possible to appropriately control the viscosity during the compression molding.

(Properties of Resin Composition, Manufacturing Method, and the Like)

The resin composition according to the present embodiment is solid at room temperature of 25° C.

The properties of the resin composition according to the present embodiment can be powdery, granular, or the like.

The resin composition according to the present embodiment can be produced by, for example, (1) mixing each component using a mixer, (2) obtaining a kneaded product using a roll, and (3) cooling and then pulverizing the obtained kneaded product (from the above, a powdery resin composition can be obtained).

<Method for Manufacturing Magnetic Member>

The resin composition according to the present embodiment is molded into a desired shape by a compression molding method.

A magnetic member can be obtained by placing the above-described resin composition in a mold using a compression molding apparatus and curing the resin composition. The molded product can be suitably used, for example, as a magnetic component in an electric/electronic device. More specifically, the molded product is preferably used as a magnetic core of a coil (also called a reactor or an inductor depending on the application or purpose).

Various conditions in the compression molding can be set optionally. For example, the preheating temperature can be appropriately adjusted to 60° C. to 100° C., the heating temperature for melting can be appropriately adjusted to 150° C. to 200° C., the mold temperature can be appropriately adjusted to 150° C. to 200° C., and the pressure at which the molten product of the resin composition is injected into the mold can be appropriately adjusted between 1 to 20 MPa.

<Magnetic Member and Coil>

A magnetic member formed by the resin composition according to the present embodiment (magnetic member formed by curing the resin composition according to the present embodiment) and a coil including the magnetic member as a magnetic core or an exterior member will be described.

(First Aspect)

Figure 1A:
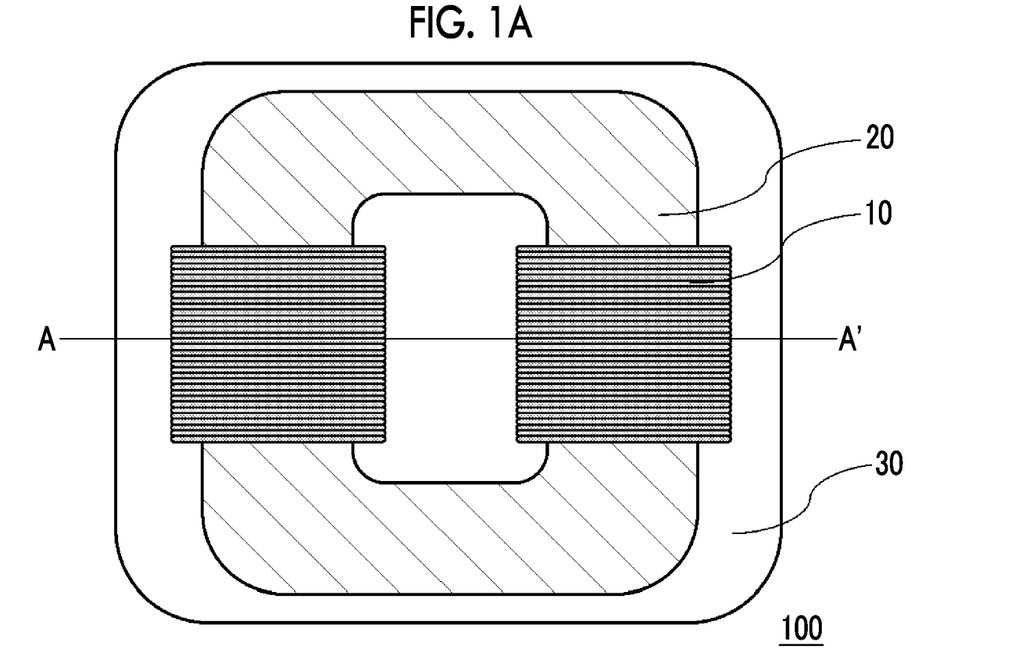
FIGS. 1A and 1B are diagrams schematically showing a coil including a magnetic core.
Figure 1B:
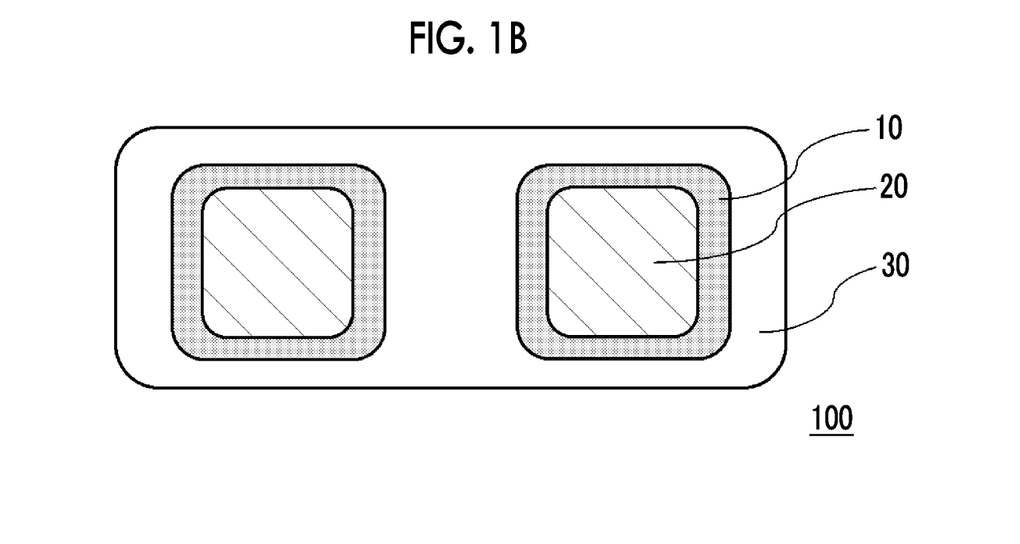

FIGS. 1A and 1B are diagrams schematically showing a coil 100 (reactor) including a magnetic core composed of a cured product of the resin composition according to the present embodiment.

FIG. 1A shows an outline of the coil 100 as viewed from above. FIG. 1B shows a cross-sectional view taken along a line A-A' in FIG. 1A.

As shown in FIGS. 1A and 1B, the coil 100 can include a winding 10 and a magnetic core 20. The magnetic core 20 is filled inside the winding 10 which is an air-core coil. The pair of windings 10 shown in FIG. 1A are connected in parallel. In this case, the annular magnetic core 20 has a structure which penetrates an inside of the pair of windings 10 shown in FIG. 1B. The magnetic core 20 and the winding 10 can have an integrated structure.

From the viewpoint of ensuring insulation of these, the coil 100 may have a structure in which an insulator (not shown) is interposed between the winding 10 and the magnetic core 20.

In the coil 100, the winding 10 and the magnetic core 20 may be sealed by an exterior member 30 (sealing member). For example, the winding 10 and the magnetic core 20 are housed in a housing (case), a liquid resin is introduced therein, and the liquid resin is cured as necessary, so that the exterior member 30 may be formed around the winding 10 and the magnetic core 20. In this case, the winding 10 may have a drawing portion (not shown) in which an end portion of the winding is pulled out to an outside of the exterior member 30.

The winding 10 is usually formed by winding a winding having an insulating coating on the surface of a metal wire. The metal wire preferably has high conductivity, and copper and copper alloys can be preferably used. In addition, as the insulating coating, a coating such as enamel can be used. Examples of a cross-sectional shape of the winding include a circular shape, a rectangular shape, and a hexagonal shape.

On the other hand, a cross-sectional shape of the magnetic core 20 is not particularly limited, but for example, in cross-sectional view, the cross-sectional shape may be a circular shape or a polygonal shape such as a quadrangle or a hexagon.

According to the cured product of the resin composition according to the present embodiment, the magnetic core 20 having excellent moldability and magnetic characteristics can be realized. That is, the coil 100 provided with the magnetic core 20 is expected to have good mass production suitability and a small iron loss. In addition, since the magnetic core 20 having excellent mechanical properties can be realized, it is possible to improve durability, reliability, and manufacturing stability of the coil 100. Therefore, the coil 100 can be used as a reactor for a booster circuit or a large current.

(Second Aspect)

As an aspect different from the above-described coil, an outline of a coil (inductor) including an exterior member composed of a cured product of the resin composition according to the present embodiment will be described with reference to FIGS. 2A and 2B.

Figure 2A:
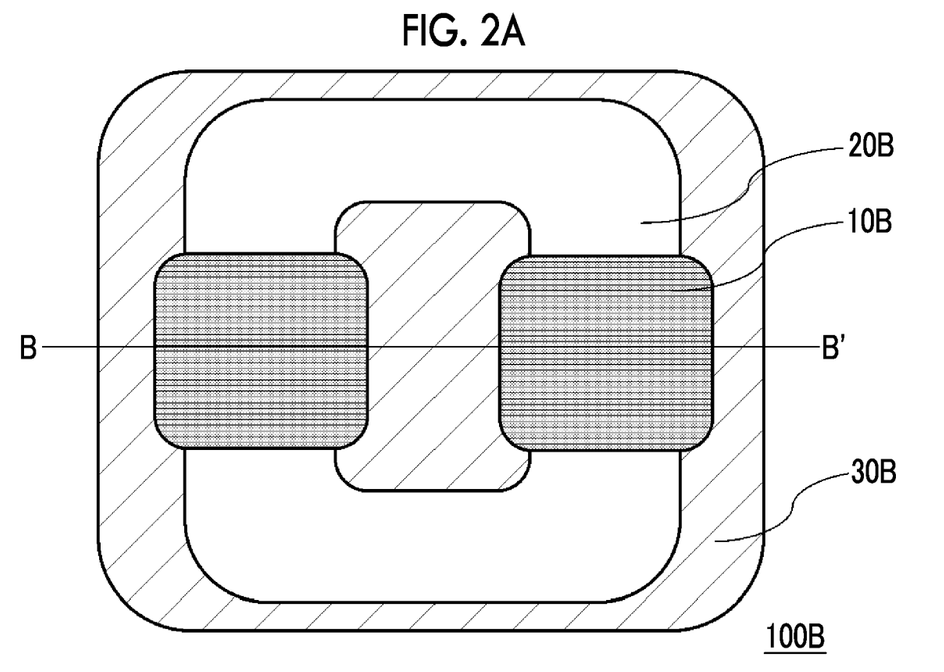
FIGS. 2A and 2B are diagrams schematically showing a coil including a magnetic core (aspect different from that of FIGS. 1A and 1B).

FIG. 2A shows an outline of a coil 100B as viewed from above. FIG. 2B shows a cross-sectional view taken along a line B-B' in FIG. 2A.

Figure 2B:
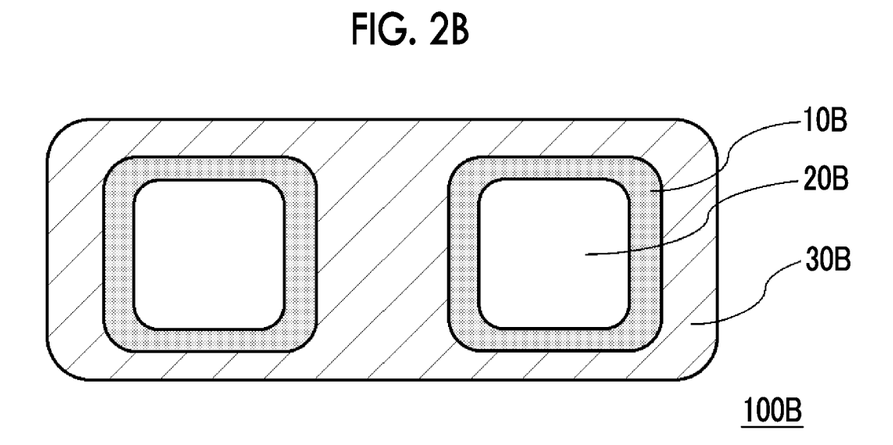

As shown in FIGS. 2A and 2B, the coil 100B can include a winding 10B and a magnetic core 20B. The magnetic core 20B is filled inside the winding 10B which is an air-core coil. The pair of windings 10B shown in FIG. 2A are connected in parallel. In this case, the annular magnetic core 20B has a structure which penetrates an inside of the pair of windings 10B shown in FIG. 2B. These magnetic cores 20B and windings 10B can be individually produced, and have a combined structure in combination.

From the viewpoint of ensuring insulation of these, the coil 100B may have a structure in which an insulator (not shown) is interposed between the winding 10B and the magnetic core 20B.

In the coil 100B, the winding 10B and the magnetic core 20B are sealed by an exterior member 30B (sealing member). For example, by placing the magnetic core 20B filled in the winding 10B in a mold, and molding the mold by compression molding or the like using the resin composition according to the present embodiment, the resin composition can be cured to form the exterior member 30B around the winding 10B and the magnetic core 20B. In this case, the winding 10B may have a drawing portion (not shown) in which an end portion of the winding is pulled out to an outside of the exterior member 30B.

The winding 10B is usually formed by winding a conducting wire having an insulating coating on the surface of a metal wire. The metal wire preferably has high conductivity, and copper and copper alloys can be preferably used. In addition, as the insulating coating, a coating such as enamel can be used. Examples of a cross-sectional shape of the winding 10B include a circular shape, a rectangular shape, and a hexagonal shape.

On the other hand, a cross-sectional shape of the magnetic core 20B is not particularly limited, but for example, in cross-sectional view, the cross-sectional shape may be a circular shape or a polygonal shape such as a quadrangle or a hexagon. As the magnetic core 20B, for example, a powder iron core composed of a magnetic powder and a binder can be used.

According to the cured product of the resin composition according to the present embodiment, the exterior member 30B having excellent moldability and magnetic characteristics can be realized, so that low magnetic loss is expected in the coil 100B provided with the magnetic core 20B. In addition, since the exterior member 30B having excellent mechanical properties can be realized, it is possible to improve durability, reliability, and manufacturing stability of the coil 100B.

(Third Aspect)

As still another aspect, an outline of an integrated inductor including a magnetic core composed of a cured product of the resin composition according to the present embodiment and an exterior member will be described with reference to FIGS. 3A and 3B.

Figure 3A:
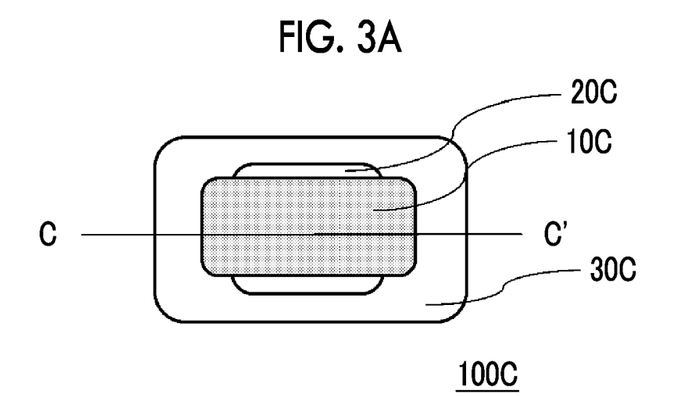
FIGS. 3A and 3B are diagrams schematically showing an integrated inductor.

FIG. 3A shows an outline of the structure viewed from the upper surface of an integrated inductor 100C. FIG. 3B shows a cross-sectional view taken along a line C-C' in FIG. 3A.

Figure 3B:
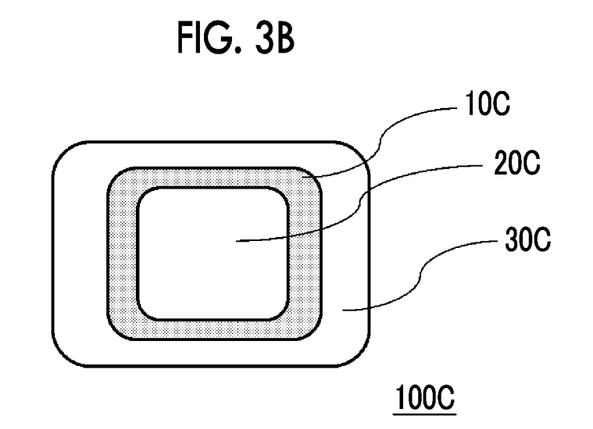

As shown in FIGS. 3A and 3B, the integrated inductor 100C can include a winding 10C and a magnetic core 20C. The magnetic core 20C is filled inside the winding 10C which is an air-core coil. The winding 10C and the magnetic core 20C are sealed by an exterior member 30C (sealing member). The magnetic core 20C and the exterior member 30C can be composed of the cured product of the resin composition according to the present embodiment. The magnetic core 20C and the exterior member 30C may be formed as seamless integral members.

As a method for manufacturing the integrated inductor 100C, for example, the winding 10C is placed in a mold, and mold molding such as compression molding is performed using the resin composition according to the present embodiment. As a result, the resin composition can be cured to integrally form the magnetic core 20C filled in the winding 10C and the exterior member 30C around these. In this case, the winding 10C may have a drawing portion (not shown) in which an end portion of the winding is pulled out to an outside of the exterior member 30C.

The winding 10C is usually formed by winding a conducting wire having an insulating coating on the surface of a metal wire. The metal wire preferably has high conductivity, and copper and copper alloys can be preferably used. In addition, as the insulating coating, a coating such as enamel can be used. Examples of a cross-sectional shape of the winding 10C include a circular shape, a rectangular shape, and a hexagonal shape.

On the other hand, a cross-sectional shape of the magnetic core 20C is not particularly limited, but for example, in cross-sectional view, the cross-sectional shape may be a circular shape or a polygonal shape such as a quadrangle or a hexagon. Since the magnetic core 20C is composed of a compression molded product of the resin composition according to the present embodiment, it is possible to have a desired shape.

According to the cured product of the resin composition according to the present embodiment, the magnetic core 20C and exterior member 30C, which have excellent moldability and magnetic characteristics, can be realized, so that low magnetic loss is expected in the integrated inductor 100C having these. In addition, since the exterior member 30C having excellent mechanical properties can be realized, it is possible to improve durability, reliability, and manufacturing stability of the integrated inductor 100C. Therefore, the integrated inductor 100C can be used as an inductor for a booster circuit or a large current.

The embodiments of the present invention have been described above, but these are examples of the present invention and various configurations other than the above can be adopted. In addition, the present invention is not limited to the above-described embodiments, and modifications, improvements, and the like within the range in which the object of the present invention can be achieved are included in the present invention.

EXAMPLES

Hereinafter, the present invention will be described in detail with reference to Examples, but the present invention is not limited to the description of Examples.

<Preparation of Resin Composition>

Magnetic particles were added to non-magnetic particles to be mixed, and other components shown in Table 1 were mixed using a mixer according to blending ratio in Table 1 to obtain a mixture. The obtained mixture was roll-kneaded, and the obtained kneaded product was pulverized to obtain a powdery and granular resin composition.

The amount of each component shown in Table 1 is part by mass.

Specifically, raw material components shown in Table 1 are as follows.

(Epoxy Resin)

Epoxy resin 1: epoxy resin represented by the following chemical formula (manufactured by Mitsubishi Chemical Corporation, product number: E1032H60, solid at 25° C., ICI viscosity at 150° C.: 650 mPa·s)

Epoxy resin 2: epoxy resin represented by the following chemical formula (manufactured by Mitsubishi Chemical Corporation, product number: YL6810, solid at 25° C., ICI viscosity at 150° C.: 15 mPa·s)

(Phenol-Based Curing Agent)

Phenol resin 1: novolac-type phenol resin represented by the following chemical formula (manufactured by Sumitomo Bakelite Co., Ltd., product number: PR-HF-3, solid at 25° C.)

(Mold Release Agent)

Mold release agent 1: synthetic wax (manufactured by Clariant, WE-4)

(Curing Catalyst)

Curing catalyst 1: imidazole-based curing catalyst (manufactured by SHIKOKU CHEMICALS CORPORATION, CUREZOL 2PZ-PW)

(Magnetic Particles)

Magnetic particles 1: amorphous magnetic powder (manufactured by Epson Atmix Corporation, KUAMET6B2, median diameter $D_{50}$: 50 µm, Fe: 88% by mass, specific gravity: 6.9)

Magnetic particles 2: amorphous magnetic powder (manufactured by Epson Atmix Corporation, AW2-08, median diameter $D_{50}$: 3.4 µm, Fe: 88% by mass, specific gravity: 6.9)

(Non-Magnetic Particles)

Silica particles 1: fine powder silica (spherical, fused silica, median diameter $D_{50}$: 0.5 µm, specific gravity: 2.2)

Silica particles 2: fine powder silica (spherical, fused silica, median diameter $D_{50}$: 1.5 µm, specific gravity: 2.2)

Silica particles 3: fine powder silica (spherical, fused silica, median diameter $D_{50}$: 0.2 µm, specific gravity: 2.2)

Alumina particles 1: fine powder alumina (spherical, median diameter $D_{50}$: 0.2 µm, specific gravity: 3.7)

The median diameter of the particles was measured using a laser diffraction/scattering type particle diameter distribution measuring device. The specific gravity was measured using a powder densitometer by a vapor phase substitution method.

<Performance Evaluation>

The following evaluations were carried out for each resin composition.

(Compression Moldability)

The obtained resin composition was molded using a compression molding machine (manufactured by TOWA JAPAN, PMC1040) at a mold temperature of 175° C., a molding pressure of 9 MPa, and a curing time of 180 seconds to form a molded product (magnetic member) having a length of 54 mm, a width of 214 mm, and a thickness of 3 mmt on a surface of a substrate having a length of 62 mm and a width of 220 mm.

After the compression molding, the molded product was taken out from the mold, and the state of resin burrs flowing out from an end surface of the substrate on a side surface side was visually observed. A case where no resin burr of 4 mm or more occurred was evaluated as o, and a case where resin burrs of more than 4 mm occurred was evaluated as x.

(Saturation Magnetic Flux Density)

The obtained resin composition was injection-molded using a low-pressure transfer molding machine ("KTS-30" manufactured by KOHTAKI Corporation) at a mold temperature of 175° C., an injection pressure of 9.8 MPa, and a curing time of 120 seconds to obtain a columnar molded product having a diameter of 16 mm (and a height of 32 mm. Next, the obtained molded product was post-cured at 175° C. for 4 hours to produce a test piece for evaluating saturation magnetic flux density.

Next, at room temperature (25° C.), using an AC/DC magnetization characteristic test device (manufactured by METRON Technology Research, MTR-3368), an external magnetic field of 100 kA/m was applied to the molded product. As a result, the saturation magnetic flux density (T) at room temperature was measured.

(Relative Magnetic Permeability)

The obtained resin composition was injection-molded using a low-pressure transfer molding machine ("KTS-30" manufactured by KOHTAKI Corporation) at a mold temperature of 175° C., an injection pressure of 9.8 MPa, and a curing time of 120 seconds to obtain a columnar molded product having a diameter of 16 mm (and a height of 32 mm. Next, the obtained molded product was post-cured at 175° C. for 4 hours to produce a test piece for evaluating relative magnetic permeability. With regard to the obtained columnar molded product, using a DC/AC magnetization characteristic test device ("MTR-3368" manufactured by Metron Giken Co., Ltd.), a B-H initial magnetization curve was measured in a range of H=0 to 100 kA/m, a value of H=5 kA/m of the B-H initial magnetization curve was defined as the relative magnetic permeability.

(Iron Loss (50 mT, 20 kHz))

The obtained resin composition was injection-molded using a low-pressure transfer molding machine ("KTS-30" manufactured by KOHTAKI Corporation) at a mold temperature of 175° C., an injection pressure of 9.8 MPa, and a curing time of 120 seconds to obtain a ring-shaped molded product having an outer diameter of 27 mmφ, an inner diameter of 15 mmφ, and a thickness of 3 mm. Next, the obtained molded product was post-cured at 175° C. for 4 hours to produce a ring-shaped test piece. With regard to the obtained ring-shaped test piece, using a BH curve tracer, a hysteresis loss Wh (kW/m$^3$) and an eddy current loss We (kW/m$^3$) at an excitation magnetic flux density Bm: 50 mT and a measurement frequency: 20 kHz were measured, and the hysteresis loss Wh+the eddy current loss We was calculated as the iron loss (kW/m$^3$).

Compositions and evaluation results of each resin composition are listed in the table below.

TABLE 1

| | | | Unit | Comparative Example 1 | Example 1 | Example 2 | Example 3 | Example 4 |
|---|---|---|---|---|---|---|---|---|
| Resin composition | Epoxy resin | Epoxy resin 1 | % by mass | 1.4 | 1.1 | 1.1 | 1.1 | 1.1 |
| | | Epoxy resin 2 | | 1.4 | 1.2 | 1.2 | 1.2 | 1.2 |
| | Phenol-based curing agent | Phenol resin 1 | | 1.7 | 1.4 | 1.4 | 1.4 | 1.4 |
| | Mold release agent | Mold release agent 1 | | 0.1 | 0.1 | 0.1 | 0.1 | 0.1 |
| | Curing catalyst | Curing catalyst 1 | | 0.1 | 0.1 | 0.1 | 0.1 | 0.1 |
| | Magnetic particles | Magnetic particles 1 | | 76.2 | 75.7 | 75.7 | 75.7 | 75.0 |
| | | Magnetic particles 2 | | 19.1 | 18.9 | 18.9 | 18.9 | 18.7 |
| | Non-magnetic particles | Silica particles 1 | | | 1.5 | | | |
| | | Silica particles 2 | | | | 1.5 | | |
| | | Silica particles 3 | | | | | 1.5 | |
| | | Alumina particles 1 | | | | | | 2.4 |
| | Total | | | 100.00 | 100.00 | 100.00 | 100.0 | 100.00 |
| | Content of magnetic particles in resin composition (volume basis) | | vol % | 78.2 | 78.2 | 78.2 | 78.2 | 78.2 |

TABLE 1-continued

|  | Unit | Comparative Example 1 | Example 1 | Example 2 | Example 3 | Example 4 |
| --- | --- | --- | --- | --- | --- | --- |
| Content of non-magnetic particles in resin composition (volume basis) | vol % | 0.0 | 3.8 | 3.8 | 3.8 | 3.8 |
| Resin burrs during molding |  | x | ○ | ○ | ○ | ○ |
| Saturation magnetic flux density | T | 1.09 | 1.08 | 1.06 | 1.07 | 1.06 |
| Relative magnetic permeability |  | 26 | 21 | 24 | 23 | 23 |

(Minimum Melt Viscosity)

With regard to the resin composition of Example 1, using a rheometer ("HAAKEMARS III manufactured by Thermo Fisher Scientific Inc.), a melt viscosity (Pa·s) at 80° C. to 250° C. was measured under the conditions of a heating rate 10° C./min and a frequency of 1 Hz. As a result, the minimum melt viscosity of Example 1 was 150 Pa s at 136° C.

Since the resin compositions of Examples 1 to 3 showed a result that the occurrence of the resin burrs during compression molding could be suppressed as compared with Comparative Example 1, it was found that the resin compositions were suitably used for the compression molding.

In addition, since the molded products obtained by compression-molding the resin compositions of Examples 1 to 3 showed a practically acceptable level of relative magnetic permeability and iron loss, it was found that the molded products could be used as a magnetic member.

Priority is claimed on Japanese Patent Application No. 2019-093896, filed May 17, 2019, and Japanese Patent Application No. 2019-199674, filed Nov. 1, 2019, the disclosure of which is incorporated herein by reference.

REFERENCE SIGNS LIST

- 10: winding
- 20: magnetic core
- 30: exterior member
- 100: coil
- 10B: winding
- 20B: magnetic core
- 30B: exterior member
- 10 GB: coil
- 10C: winding
- 20C: magnetic core
- 30C: exterior member
- 100C: integrated inductor

The invention claimed is:

1. A resin composition for forming a magnetic member, which is used for compression molding, comprising:
   a thermosetting resin;
   magnetic particles; and
   non-magnetic particles having a lower specific gravity and a smaller cumulative 50% particle diameter $D_{50}$ than the magnetic particles,
   wherein the resin composition for forming a magnetic member is solid at 25° C.,
   wherein the magnetic particles include two or more kinds of iron-based particles having different average particle diameters,
   wherein the thermosetting resin includes an epoxy resin, and
   wherein an amount of the epoxy resin in the resin composition is 0.5 to 20% by mass based on the entire resin composition.

2. The resin composition for forming a magnetic member according to claim 1,
   wherein the non-magnetic particles include silica particles.

3. The resin composition for forming a magnetic member according to claim 1,
   wherein the specific gravity of the non-magnetic particles is 1.5 or more and 6.0 or less.

4. The resin composition for forming a magnetic member according to claim 1,
   wherein the cumulative 50% particle diameter $D_{50}$ of the non-magnetic particles is 0.05 μm or more and 3.0 μm or less.

5. The resin composition for forming a magnetic member according to claim 1,
   wherein the non-magnetic particles are surface-treated.

6. The resin composition for forming a magnetic member according to claim 1,
   wherein a content of the non-magnetic particles in terms of volume is 1% by volume or more and 10% by volume or less in a total of 100% by volume of the non-magnetic particles and the magnetic particles.

7. The resin composition for forming a magnetic member according to claim 1,
   wherein the iron-based particles include iron-based amorphous particles.

8. The resin composition for forming a magnetic member according to claim 1,
   wherein the iron-based particles include particles having Fe in an amount of 85% by mass or more.

9. The resin composition for forming a magnetic member according to claim 1,
   wherein contents of the magnetic particles and the non-magnetic particles in terms of volume are 60% by volume or more and 95% by volume or less in 100% by volume of a solid content of the resin composition for forming a magnetic member.

10. The resin composition for forming a magnetic member according to claim 1,
    wherein the epoxy resin includes a polyfunctional epoxy resin having three or more epoxy groups in a molecule.

11. The resin composition for forming a magnetic member according to claim 10,
    wherein the epoxy resin includes a bisphenol-type epoxy resin.

12. The resin composition for forming a magnetic member according to claim 11,
    wherein, in a case where the number of moles of the epoxy group included in the polyfunctional epoxy resin is defined as M1 and the number of moles of an epoxy group included in the bisphenol-type epoxy resin is defined as M2, a value of M1/M2 is 0.2 or more and 1.8 or less.

13. The resin composition for forming a magnetic member according to claim 1, further comprising:
    a mold release agent, a curing agent or a curing catalyst.

14. The resin composition for forming a magnetic member according to claim 1,
  wherein the resin composition for forming a magnetic member is in a form of powder or granules.

15. The resin composition for forming a magnetic member according to claim 1,
  wherein a minimum melt viscosity of the resin composition for forming a magnetic member, which is measured in a range of 80° ° C. to 250° C., is 50 Pa·s or more and 500 Pa·s or less.

16. The resin composition for forming a magnetic member according to claim 1,
  wherein a temperature at which a melt viscosity of the resin composition for forming a magnetic member is minimum, which is measured in a range of 80° C. to 250° ° C., is within a range of 100° ° C. or higher and 150° ° C. or lower.

17. A method for manufacturing a magnetic member, comprising:
  placing the resin composition for forming a magnetic member according to claim 1 in a mold using a compression molding apparatus; and
  curing the resin composition for forming a magnetic member to obtain a magnetic member.

\* \* \* \* \*